United States Patent [19]

Smith, Jr. et al.

[11] 3,855,760

[45] Dec. 24, 1974

[54] PEPPER HARVESTER

[75] Inventors: Jay G. Smith, Jr.; Jerry R. Joyce, both of Forsyth, N.C.

[73] Assignee: R. J. Reynolds Tobacco Company, Winston-Salem, N.C.

[22] Filed: Apr. 5, 1973

[21] Appl. No.: 348,402

[52] U.S. Cl. .................. 56/13.2, 56/35, 56/130
[51] Int. Cl. ............................................. A01d 45/22
[58] Field of Search ... 56/30, 33, 34, 35, 12.8–13.9, 56/327, 328, 126–130

[56] References Cited
UNITED STATES PATENTS

| | | | |
|---|---|---|---|
| 359,724 | 3/1887 | Hanks | 56/30 |
| 432,420 | 7/1890 | Masters | 56/30 |
| 1,778,587 | 10/1930 | Crumley | 56/35 |
| 2,639,573 | 5/1953 | McLaughlin | 56/328 R |
| 2,760,325 | 8/1956 | Witt | 56/33 X |

Primary Examiner—Russell R. Kinsey
Attorney, Agent, or Firm—Grover M. Myers; Manford Haxton

[57] ABSTRACT

This invention relates to a harvester for use in harvesting crops such as peppers, beans and the like. The harvester includes a stripper head which will remove the fruit and foliage from a plant and a pneumatic conveying system which will entrain the fruit and foliage in the stripper head and transport it through a separator unit where the aggregate can be removed from the air stream. The separator deposits the aggregate on a mechanical conveyor to be transported to a collection means.

13 Claims, 9 Drawing Figures

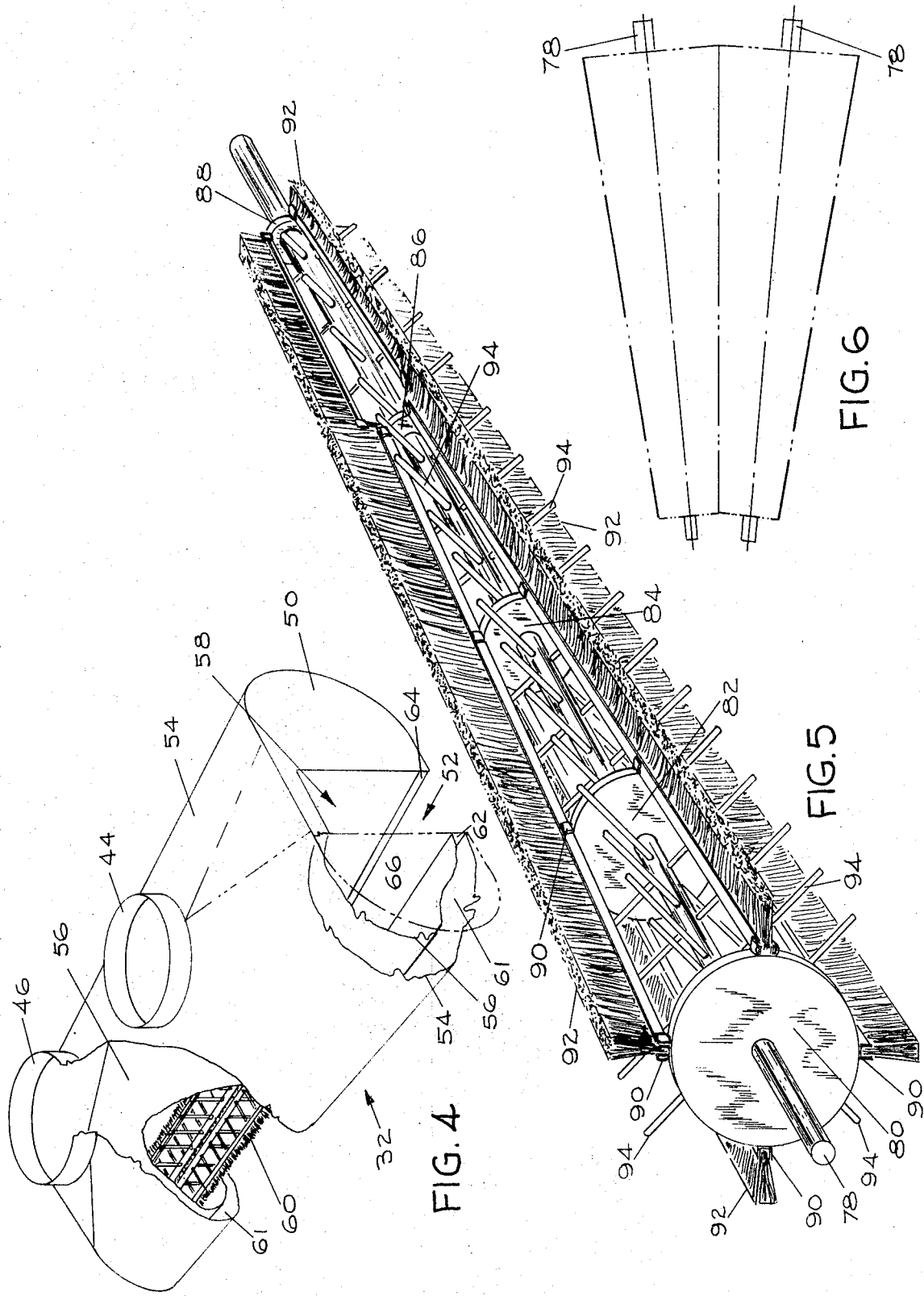

→ PEPPER
--→ AIR

PEPPER HARVESTER

BACKGROUND OF THE INVENTION

This invention relates to a mechanical vegetable harvester and, more particularly, to a harvester having a stripper head for mechanically stripping fruit and leaf foliage from a bush or plant, such as a pepper, bean, etc. and pneumatically conveying the fruit and leaf from the stripper head to a separator unit where the fruit and leaf are separated from the air stream and deposited on a mechanical conveyor system which conveys aggregate material to a collection receptacle.

Most of the presently known harvesters which use a pneumatic conveying system are of the cotton harvester variety. A pneumatic conveyor system can be used in this type of machine because the cotton fruit is light and easy to entrain and convey in an air stream. The presently used cotton harvesters use a pair of vertically positioned stripper reels which rotate against the plant and pull the cotton fruit and foliage from the plant. The aggregate fruit and foliage are then separated from the conveying air and transported into a storage bin.

Two such harvesters are disclosed in U.S. Pat. No. 2,702,976 to Diserens and U.S. Pat. No. 2,741,888 to Hamel et al. In the Diserens harvester, the cotton plants pass into the stripper housing which has two non-powered vertical gathering reels journaled therein. The gathering reels have intermeshing fingers. As the harvesters move down the row of cotton plants, each plant passes between the gathering reels causing them to rotate, thereby permitting the fingers to strip the cotton fruit from the plants. The housing is connected to both the positive and negative sides of the blower unit so that air will flow in a transverse direction within the housing. The fruit and foliage knocked from the plants are transported through a duct to a separating unit which removes the fruit and foliage from the air stream which is then returning to the negative side of the blower.

The harvester illustrated in the Hamel et al patent has a stripper head similar to the Diserens harvester in that the plants will pass between two non-powered, rotatable, vertical spindles which knock the fruit from the plant. A doffer removes the fruit from the spindle and then deposits it in the flow stream of a pneumatic conveying system. The pneumatic conveyor system of the Hamel device uses a positive flow only which enters the bottom edge of the stripper housing. The fruit stripped from the plants is deposited in the air stream so that it can be transported through a duct into a collection bin.

Although these present harvesters appear to operate efficiently when harvesting cotton, it has been found that they are almost inoperative when used with a vegetable crop, such as peppers or beans. The two basic problems encountered when using presently known harvesters to harvest vegetable crops relate to the structure of the stripper head and the operation of the pneumatically conveying system. One problem with the vertically positioned stripper reels, as used in the Diserens harvester, is the requirement for the stripper to defoliate the whole plant at once. This will cause excess stem or branch breakage, thus, causing excess foliage to be picked up in the conveying air stream. These vertical stripper reels also have a tendency to knock the plants over if their stalks are not vertical because the entire plant has to enter the stripper reels at approximately the same time. The fingers of the stripper reels in the Diserens device also have barbs around the peripheral so that when the fingers contact the cotton fruit it is pulled from the cotton pods. Since vegetables will not be pulled off of the stems by the barbs on the fingers, it would be necessary for the fingers to actually contact the vegetables before they could be removed. This causes the vegetables to be damaged due to bruising and, in the case of peppers, it would prevent them from drying properly.

There are several disadvantages to the presently used pneumatic conveying systems. For example, in the Diserens harvester, the positive air entrance ports and negative air exit ports are positioned on the top of the stripper housing and communicate directly with the inner chamber of the housing, thus, there will be dead spots near the lower portion of the housing because the positive air will tend to be drawn transversely through the stripper reels at the closest path to the suction exit. It would also appear that turbulence may occur in the housing, especially at the rear of the housing between the stripper reels.

A strictly negative air flow or suction system would also appear to produce dead spots along the sides of the housing, thereby reducing the harvester's efficiency and producing field losses. If the suction is increased to a sufficient amount to eliminate the dead spots, debris and dirt from around the plant are picked up and transported into the collection hopper and must be separated later.

A purely positive air flow system, an example of which is disclosed in the Hamel et al. patent mentioned hereinabove, would seem to have problems also. In this positive air system, the air is introduced at the bottom of the stripper head but a very restrictive flow path is required in order to operate efficiently. The fruit must be deposited in the flow stream along the side of the stripper housing or the pneumatic conveying system will not transport it to the collection bin.

Each of the air flow systems mentioned above will also produce excessive field losses. The harvester disclosed herein is constructed and operates in such a way as to overcome the disadvantages of the presently known harvesters relating to the stripper head and to reduce field losses to a minimum.

SUMMARY OF THE INVENTION

It is, therefore, an object of the present invention to provide a harvesting machine which can be used for harvesting crops, such as peppers, beans, etc.

Another object of this invention is to provide a harvesting machine which will harvest vegetable crops with the minimum amount of field loss and minimum damage to the fruit.

Another object of this invention is to provide a machine which will pick the fruit and leaf foliage from the plant while leaving most of the stem and all of the stalk and root system in the ground.

Another b. of this invention is to provide a harvesting machine which can be used in certain varieties of crops to pick only the ripened fruit while leaving the green fruit on the plant to be picked on subsequent harvestings.

Still another object of this invention is to provide a harvesting machine which will comb through the plant and straighten the stems so that the fruit and leaf foliage can be stripped from the plant, thus, limiting the amount of stem breakage.

Still another object of this invention is to provide a harvesting machine in which the harvested fruit and leaf foliage is conveyed pneumatically from a stripper head to a separator where the fruit and leaf foliage is separated from the conveying air and deposited on a mechanical conveyor for transporting to a collection receptacle.

Still another object of this invention is to provide an improved stripper reel which will strip only the fruit and leaf foliage from the plant with minimum damage to the fruit.

Another object of this invention is to provide a pneumatic conveying system utilizing both a positive and negative air flow to entrain the fruit and transport it to a separator unit.

Still another object of this invention is to utilize a portion of the positive air flow to separate the leaf foliage from the fruit.

These and other objects are accomplished by the present invention through the use of a self-propelled harvesting apparatus having a vertically adjustable stripper head. The stripper head includes a housing having an inner chamber. The bottom of the housing has a longitudinal slot communicating with openings in its leading and trailing ends to permit the plants to enter and exit the inner chamber as the harvester moves down a row of plants. The housing is constructed with an inner and outer skin which form a passage which will allow air to flow between the skins from the top of the housing to openings or gaps located on opposite sides of the slot in the bottom of the housing. During operation of the harvester, positive air exits these gaps in a horizontal direction in order to reduce the amount of dirt and debris that is drawn into the stripper head and assist in entraining the fruit and foliage stripped from the plants in a conveying air stream.

On the top of the housing are inlet and outlet ports. The inlet port permits communication between the positive side of a blower unit and the air passage in the housing while the outlet port permits communication between the negative side of the blower and the inner chamber of the stripper head. A pair of powered stripper reels are journaled in the inner chamber of the housing on opposite sides of the bottom slot. Each stripper reel has a central shaft. The shafts are mounted in the housing so that they converge from the leading end towards the trailing end. The reel shafts are also set at an inclined angle with the leading end being highest. Alternating longitudinal rows of radially extending tines and brushes are secured to the central shafts. The tines are used to comb through the plants to disentangle the stems so that the brushes can remove the fruit and leaf foliage from the plant more easily with the minimum amount of stem breakage and fruit damage. The outline of the tines and brushes are in a generally frustro-conical shape with the larger diameter of the frustrum at the leading end of the stripper head and the smaller diameter of the frustrum at the trailing end. This permits the trailing end of the reel to be placed closer to the ground in order to strip the fruit from the bottom of the stalks. The inclined angle of the reel shafts permits the plants to be stripped from the top to the bottom.

The pneumatic conveyor system utilizes a blower to generate the positive and negative air streams in a semi-closed system. As mentioned above, the positive side of the blower is connected to the inlet port on the stripper head so that a portion of the positive air flows through the slots along the bottom of the head. The negative side of the blower is connected to the outlet port so that the air escaping from the slots at the bottom of the housing moves upwardly through the inner chamber and entrains the fruit and leaf foliage stripped from the plants and transports the aggregate through the outlet port through a separator unit.

In this separator unit the fruit and leaf foliage are separated from the air stream and are deposited onto a mechanical conveyor. The air is returned to the negative side of the blower, thus, closing the system. A portion of the air from the positive side of the blower is diverted to the mechanical conveyor system and is used to separate the leaf foliage from the fruit before the fruit is deposited in a collection receptacle.

BRIEF DESCRIPTION OF THE DRAWINGS

The foregoing and additional objects, features and advantages of the invention will be apparent to those skilled in the art from the following detailed description of a preferred embodiment thereof taken with the accompanying drawings in which:

FIG. 4 is a detailed perspective of the single stripper head housing showing the inside and outside walls of the housing;

FIG. 5 is an enlarged perspective of a stripper reel which is journaled within the stripper head housing;

FIG. 6 is a plan view of a pair of stripper reels illustrating the position of the stripper reel shafts as carried in the stripper housing;

DESCRIPTION OF A PREFERRED EMBODIMENT

Figure 1:
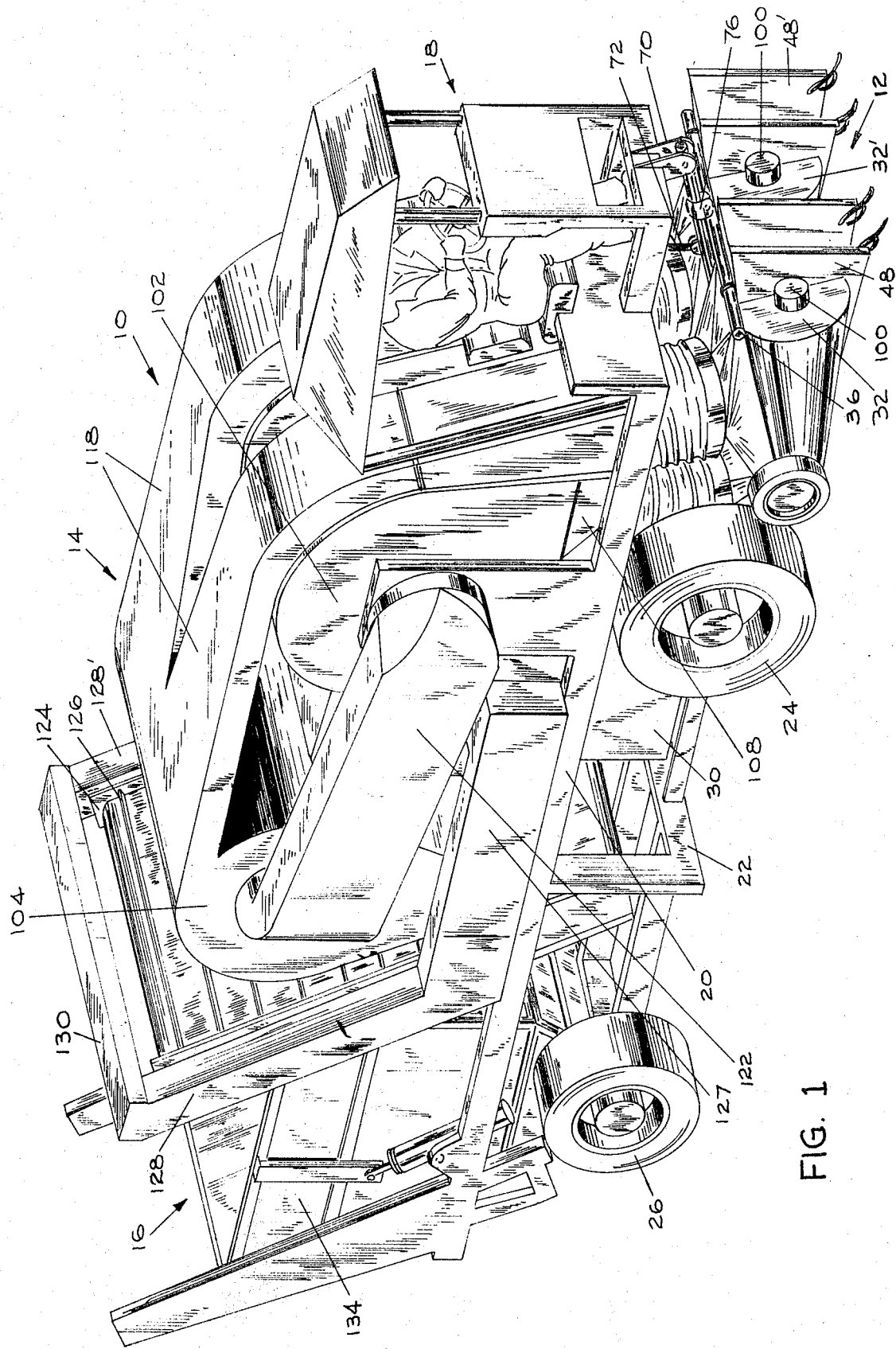
FIG. 1 is perspective of the harvesting apparatus according to the present invention.
Figure 2:
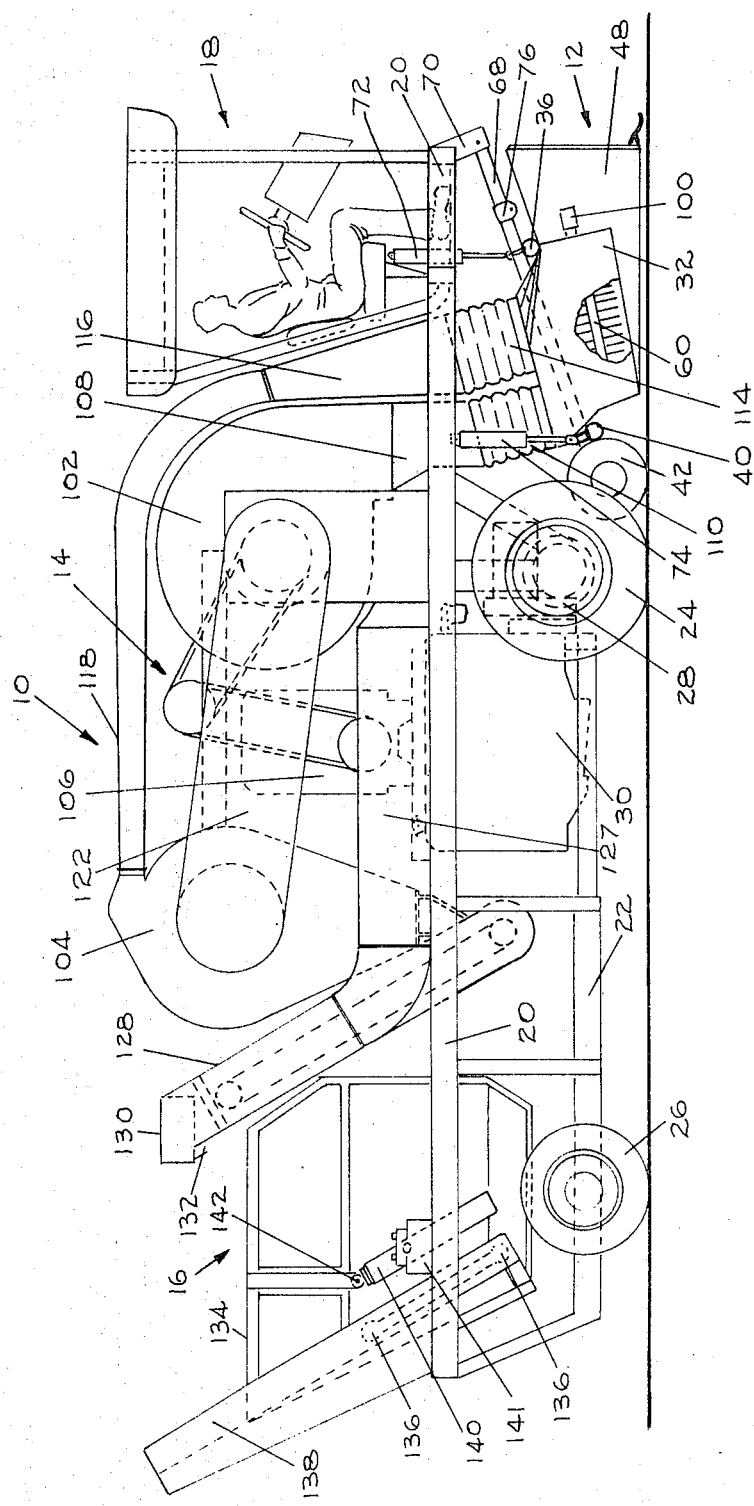
FIG. 2 is an elevation view of the harvester unit according to the present invention.

Referring more particularly to the drawings, in FIGS. 1 and 2, the numeral 10 indicates a harvester unit having a stripper section 12, a blower and separator section 14, a collection section 16, and an operator's compartment 18. The harvester unit 10 has an intermediate frame 20 which is carried on vertical struts extending upwardly from a lower frame structure 22. The lower frame 22 supports the axles for forward and rear wheels, 24 and 26 respectively. The forward wheels 24 are the driving wheels and are hydraulically driven. The hydraulic motors 170, 172 for the wheels are connected to a pump unit 28 as will be explained hereinafter. An engine 30 provides the power to drive the pump unit 28 which also includes a series of hydraulic pumps (not separately shown in FIGS. 1 and 2). These pumps are used in various hydraulic control systems in the harvester unit which will be explained hereinafter. The rear wheels 26 are used to steer the harvester unit, and are hydraulically controlled by the steering wheel in the operator's compartment.

The stripper section 12 depends from the intermediate frame 20 and is located at the forward end of unit 10 directly below the operator's compartment 18. To the rear of the operator's compartment and carried on frame 20 is the blower and separator section 14. The collection section 16 is located rearwardly and adjacent to the blower and separator section and is also carried on the intermediate frame 20.

Figure 3:
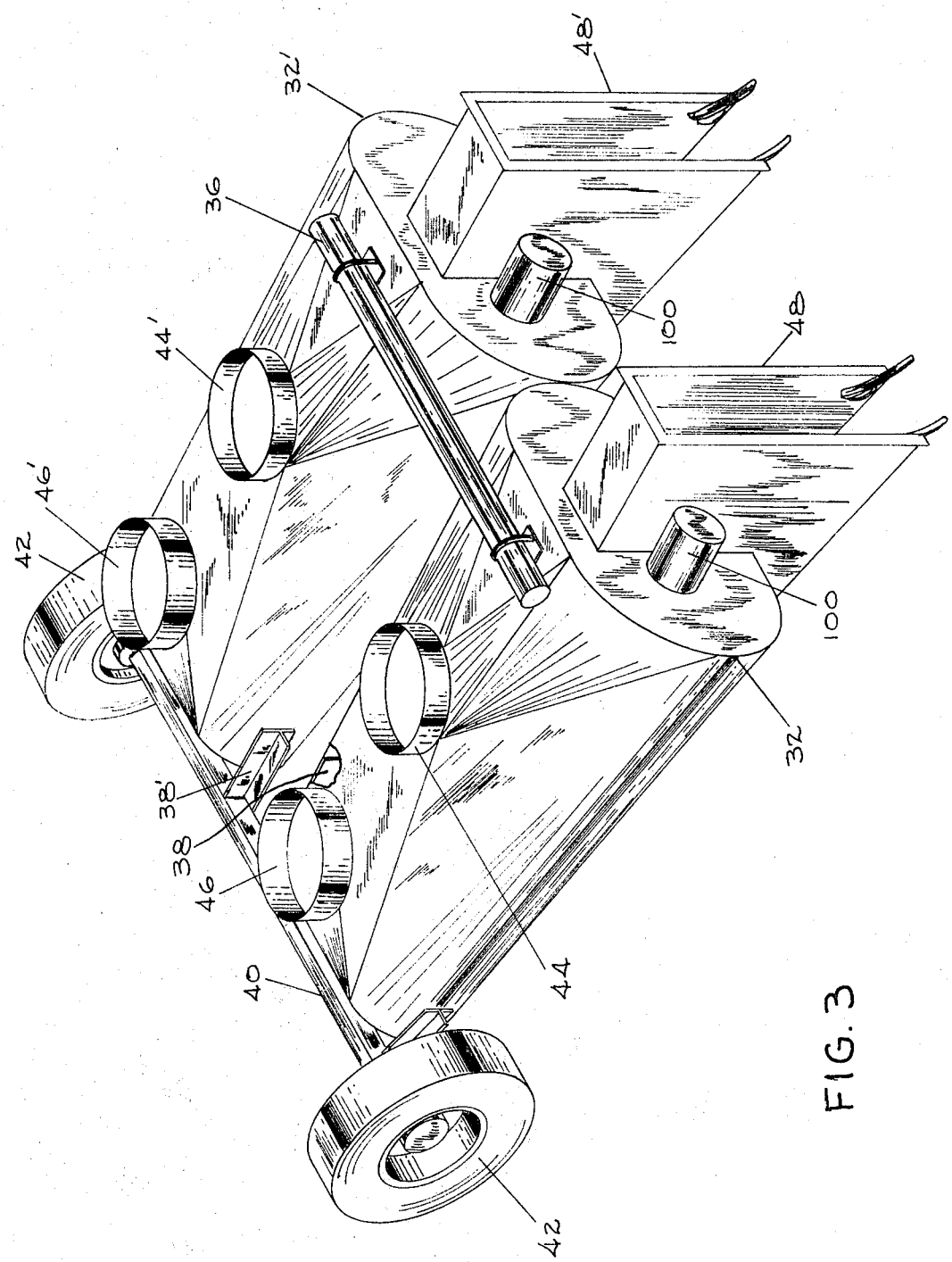
FIG. 3 is an enlarged detailed perspective of a dual stripper head arrangement utilized with the present invention.
Figure 7:
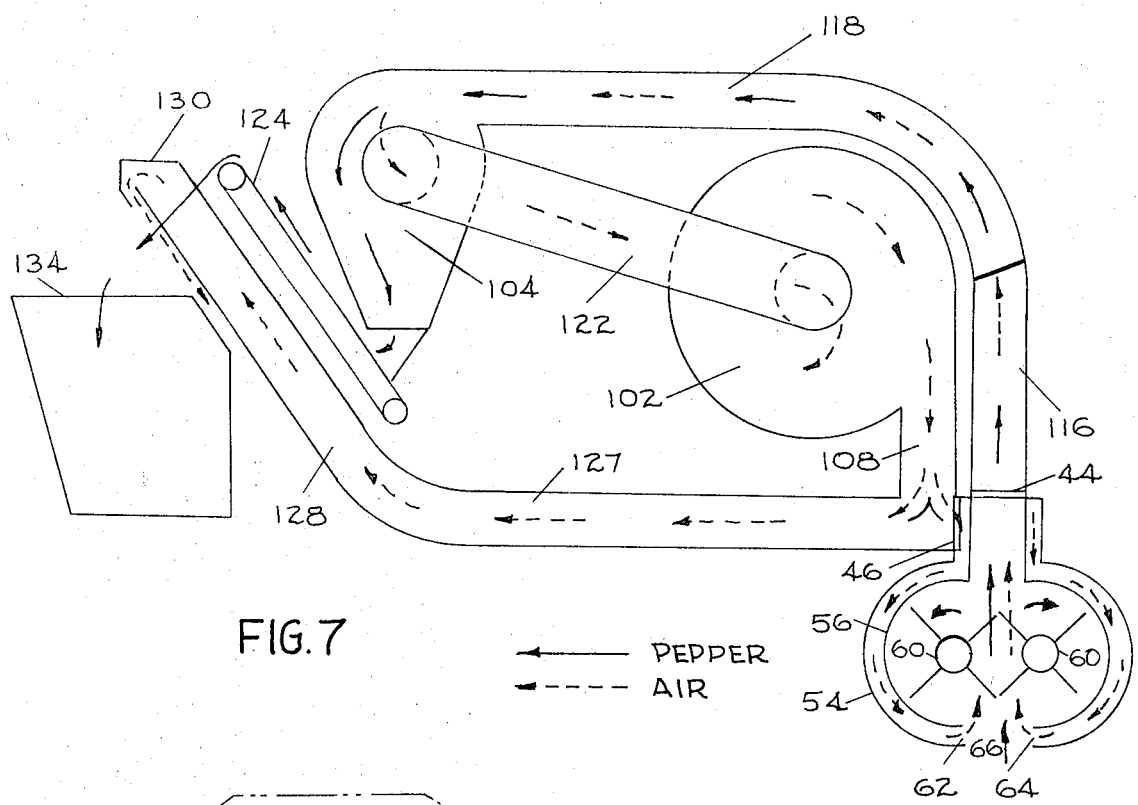
FIG. 7 is a flow diagram of the pneumatic-conveying system utilized in the present invention.

Turning now to a more detailed description of the stripper section 12, FIG. 3 illustrates a pair of stripper heads, 32 and 32' respectively, which are secured together at their forward ends by a suspension bar 36 that is attached to the top of the head housing in any suitable manner. Brackets 38 and 38' secured to the stripper head housings 32 and 32' respectively, along their inside surfaces extend rearwardly to a transverse bar 40 located behind the housing. The transverse bar 40 is secured to the brackets 38 and 38'. The transverse bar is used to maintain the spacing of the stripper head housings and carries a pair of vertically adjustable support wheels 42 on its ends. The wheels are outbound of the head housings. Although the wheels are not essential if the crops which are to be harvested are planted properly and are of the same height, they do permit minor adjustments in the height the rear or trailing end of the stripper heads is above the ground.

Forward and rear openings or ports, 44 and 46 and 44' and 46', are located on the top of the stripper head housings, 32 and 32' respectively. Inverted guide channels 48 and 48' are secured to the forward end of the housings 32 and 32'. The channels are made of a suitable sheet material and have two side members and a top plate. There is no bottom plate in the guide channel; therefore, when the stripper unit is moved down a row of crops, the plants enter the stripper housing through the guide channels 48 and 48'.

As can be seen in FIG. 4, the forward plate 50 of the housing 32 has an opening 52 which coincides with the guide channel 48 (not shown). The housing is formed of a sheet metal such as steel and has an outer and inner skin, 54 and 56 respectively. The inner skin 56 forms a chamber 58 in which a pair of identical stripper reels 60 are carried as will be described hereinafter. The outer skin generally conforms to the configuration of the inner skin and is spaced therefrom so that a passage 61 is formed between the outer and inner skins which terminates in longitudinal openings or gaps 62 and 64 along a longitudinal slot 66 in the bottom of the housing. The rear opening or port 46 located on the top of the housing communicates with the passage 61 between the inner skin 56 and outer skin 54. The forward port 44 does not communicate with the passage 61 but extends through the outer and inner skins and communicates directly with the chamber 58 within the housing.

As can be seen in FIG. 2, the stripper section 12 shown in FIG. 3 is secured to the harvester unit's intermediate frame 20 by a longitudinal bar 68 which is pivotedly secured at its forward end to a downwardly extending bracket 70 secured to a front end of the intermediate frame 20. The longitudinal bar 68 is clamped to transverse bars 36 and 40. A forward cylinder 72 having the end of its piston rod secured to the longitudinal bar 68 and two rear hydraulic cylinders 74 having the end of their piston rods secured to the transverse bar 40 are used to raise and lower the stripper section into position as the unit moves about in a field. The cylinders are secured to the intermediate frame 20. A knee joint 76 on the longitudinal bar 68 permits the position of the stripper section to be maintained as it is raised and lowered. The hydraulic controls with forward and rear pick-up cylinders, 72 and 74 respectively, will be explained hereinafter.

Turning now to the stripper reels 60, a pair of reels are carried in each of the stripper heads 32 and 32'. It can be seen in FIG. 4 that the stripper reels extend from the forward end of the housing longitudinally to the rear end of the housing. A typical stripper reel, illustrated in FIG. 5, has a central shaft 78 which carries a plurality of circular disc support members, 80, 82, 84, 86 and 88 spaced along its length. The disc support members decrease in size from the forward support member 80 to the rear support member 88. Secured to the periphery of the disc support are clamps 90 which are spaced approximately 90° apart. The clamps carry longitudinal brushes 92 which extend the length of the stripper reel from the forward disc 80 to the rear disc 88. The fiber length of the brushes 92 are generally the same, therefore, an outline generated by the ends of the brushes as the reel turns would make a frustro-conical configuration, as can be seen in FIG. 6. Bisecting each of the 90° angles between the brushes, a plurality of tines extend radially outward from the center shaft 78. The tines 94 decrease in size from the forward end just behind the forward disc 80 to the rear end just in front of the rear disc 88. A line drawn through the end of one longitudinal set of tines would generate a frustro-conical shape upon rotation of the stripper reel. The tines extend slightly outward from the ends of the brushes. When two stripper reels are positioned in the chamber 58 within a stripper head, the tines of one stripper reel will overlap the tines of the adjacent stripper reel.

The tines on one stripper reel are staggered from the tines on the adjacent stripper reel so that when the reels are rotated, the tines will not contact one another. As can be seen in FIG. 6, the stripper reels are positioned in the stripper head housing so that their shafts 78 converge toward the rear end of the stripper housing. The peripheral extension of the brushes are such that, when one longitudinal brush on one stripper reel coincides with the brush on the opposite stripper reel, the tips of the brushes are in contact with one another.

The stripper reel shafts not only converge but they are also inclined with the leading portion of the stripper reel being higher as can be seen in FIG. 2. The rear end of the shaft 78 of each stripper reel is journaled in the rear end of the stripper housing while the forward end of the shaft 78 extends through the forward face of the stripper housing and is coupled to a hydraulic motor 100 supported by a bracket on the forward end of the stripper housing. There is a hydraulic motor for each stripper reel and the motors are set up in series as will be explained hereinafter. The rotation of each pair of stripper reels is not synchronized. For best results, it has been found that the speed of the stripper reels should be approximately 1,000 R.P.M.

When the harvester unit is moving through the field, each stripper head is aligned with a single row of plants and a row of plants enters the stripper heads through the guide channels 48 and the plants are directed through the slot 66 in the bottom of the housing. The pair of stripper reels in each housing are rotated in opposite directions. The stripper reel on the right, facing the forward end of the housing, rotates in a clockwise direction while the stripper reel on the left rotates in a counterclockwise direction. This causes the tines on the stripper reels to be moving upward through the plants so that the branches or stems of the plants are combed upwardly. The overlapping portion of the tines also insures that the tines will extend beyond the center stalk to insure that the entire plant is affected by the combing action. The brushes are used to strip or wipe the leaf foliage and fruit from the stems. The purpose of having the stripper reel shafts inclined from front to rear is to have the plant defoliated from top to bottom. The purpose of making the stripper reel frustro-conical in shape is to permit the rear end of the stripper reel to be located as close to the ground as possible during the stripping operation. The rotational movement of the stripper reels upwardly also tends to cause the foliage and fruit to be moving upwardly and, thereby aids a pneumatic pick-up system used on the harvester unit.

The blower and separator section 14 which is located on the intermediate frame 20 behind the operator's compartment has a blower unit 102 and a separator unit 104 affixed on the intermediate frame. An engine 106 is mounted on the frame between the blower unit and separator unit and is used to operate the blower unit fan. In this preferred embodiment, the blower unit develops approximately 12,000 C.F.M. or 6,000 C.F.M. for each stripper head. The positive air stream from the blower unit 102 is directed through an outlet conduit 108 and is divided by a baffle assembly or other suitable means into two streams. One stream is directed downwardly through a collapsible conduit 110 into the rear port 46 of the stripper head. The air stream is directed through the passage 61 between the inner and outer walls 56 and 54 and out the gaps 62 and 64 along the slot 66 in the bottom of the stripper head. Approximately 3,000 C.F.M. of air is displaced through the gaps 62 and 64 during the operation of the harvester unit. It has been found when using 3,000 C.F.M. that the velocity of air exiting the gaps 62 and 64 at the bottom of the stripper head should be approximately 3,000 feet per minute. This can be regulated by the size of the passage 61 and gaps 62 and 64.

Figure 8:
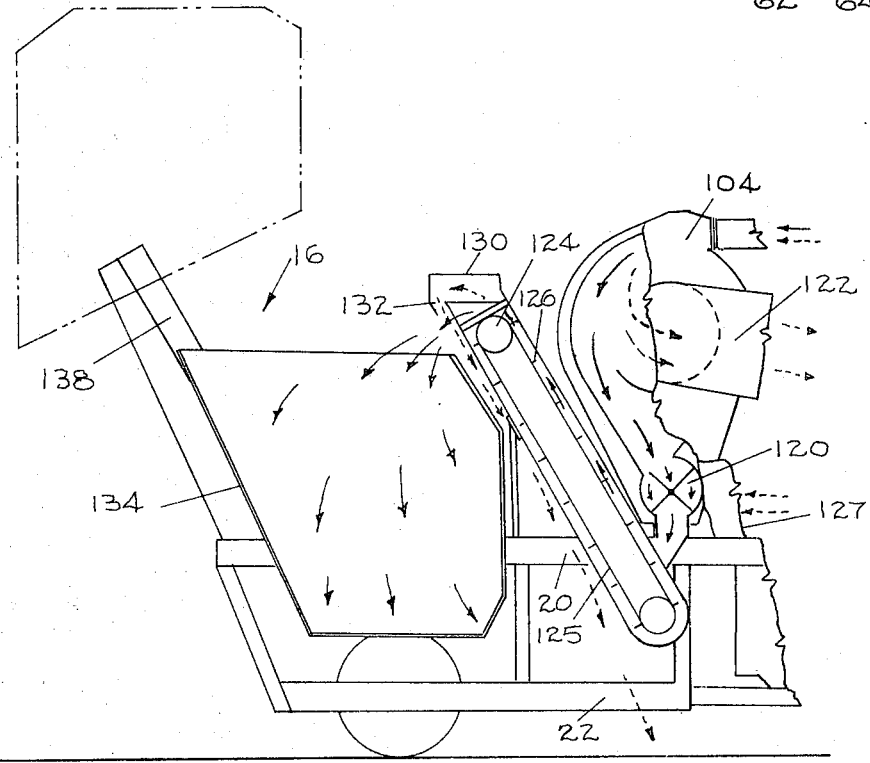
FIG. 8 is an elevation and partial sectional view of the rear portion of the harvester illustrating the separator unit, the mechanical conveyor and collection receptacle according to the present invention.

The air exiting the gaps at slot 66 has two main purposes. The first purpose is to prevent debris and dirt from being picked up from the ground as the stripper head moves along the row. The second purpose is to help initially entrain the fruit and foliage in an upward air stream. The air stream is directed upwardly because of the negative pressure which is placed in the stripper chamber 58. This negative pressure is developed by a suction from the negative side of the blower fan 102. As mentioned previously, the forward port 44 communicates directly with the inner chamber 58 of the stripper head. The forward port has a collapsible conduit 114 which extends upwardly and connects to an exit conduit 116. The air displacement on a negative side of a stripper head is approximately 6,000 C.F.M. and has a velocity of 4,000 to 5,000 feet per minute. Again, the size of the exit conduit 116 will determine the velocity of the negative air stream. The negative air stream is directed through a connection conduit 118 to the inlet side of the separator 104. The separator unit 104, as can be seen in FIG. 8, receives the entrained fruit and leaf foliage and separates the aggregate from the air stream in the usual manner. The aggregate falls into an air lock 120 while the air is directed through a return conduit 122 back into the blower 102 for recirculation.

The fruit and leaf material are deposited from the air lock onto an inclined mechanical conveyor 124 which is a part of the collection section 16. The conveyor belt 125 has a plurality of transverse cleats 126 which are used to hold the fruit on the belt as it is drawn upwardly. The conveyor is run by hydraulic motors and travels at approximately 300 feet per minute. At the top of the conveyor, the fruit and leaf is thrown off the end of the conveyor whereupon a separation of the fruit and leaf occurs.

The remaining portion of air, approximately 3,000 C.F.M., is directed through conduits 127 and 127' (not shown) rearwardly and is used to separate the leaf foliage from the fruit which has been picked. The conduits 127 and 127' are connected to inclined conduits 128 and 128' which extend upwardly along the sides of the conveyor 124. Transversely positioned across the top of the conveyor and extending from inclined conduits 128 and 128' is a slotted conduit 130 which directs the air stream downwardly on approximately the same inclined angle as the conveyor 124.

The inclined conduits 128 and 128' and the transverse conduit 130 along with the slot 132 in conduit 130 are so sized that the velocity of the air stream leaving the slot is approximately 1,000 feet per minute. Bleed valves may also be provided in inclined conduits 128 to aid in controlling this velocity. As the leaf and fruit are thrown from the top of the conveyor, the fruit which is heavier has a greater inertia, thus, permitting the lighter leaf to be easily separated by the downwardly directed air. A bucket 134 or other suitable receiving unit collects the fruit that is thrown from the conveyor. It has been found that approximately 20 percent stem and 15 percent of the leaf is contained in the final aggregate along with the fruit.

In this preferred embodiment, a bucket 134 has a dumping mechanism which includes a plurality of wheels 136 secured to the side of the bucket and which move in an inclined track 138 carried on the intermediate frame 20. Telescoping hydraulic cylinders 140 are secured to the intermediate frame 20 by suitable brackets 141 and the end of their piston rods are secured to the side of the bucket at 142. When the cylinders are operated, the bucket will move upwardly with the rollers 136 moving within the track 138. As the upper roller engages the top of the track 138, the bucket is tilted, as can be seen in FIG. 8, so that the aggregate material in the bucket can be dumped into another container or at a collection point. Although the collection bucket is disclosed in this preferred embodiment, a transverse conveyor means positioned below the top of inclined conveyor means 124 can be utilized to receive the fruit and transport it to the side of the harvester unit where it can be dumped into a collection receptacle which is being drawn through the field by a tractor.

Figure 9:
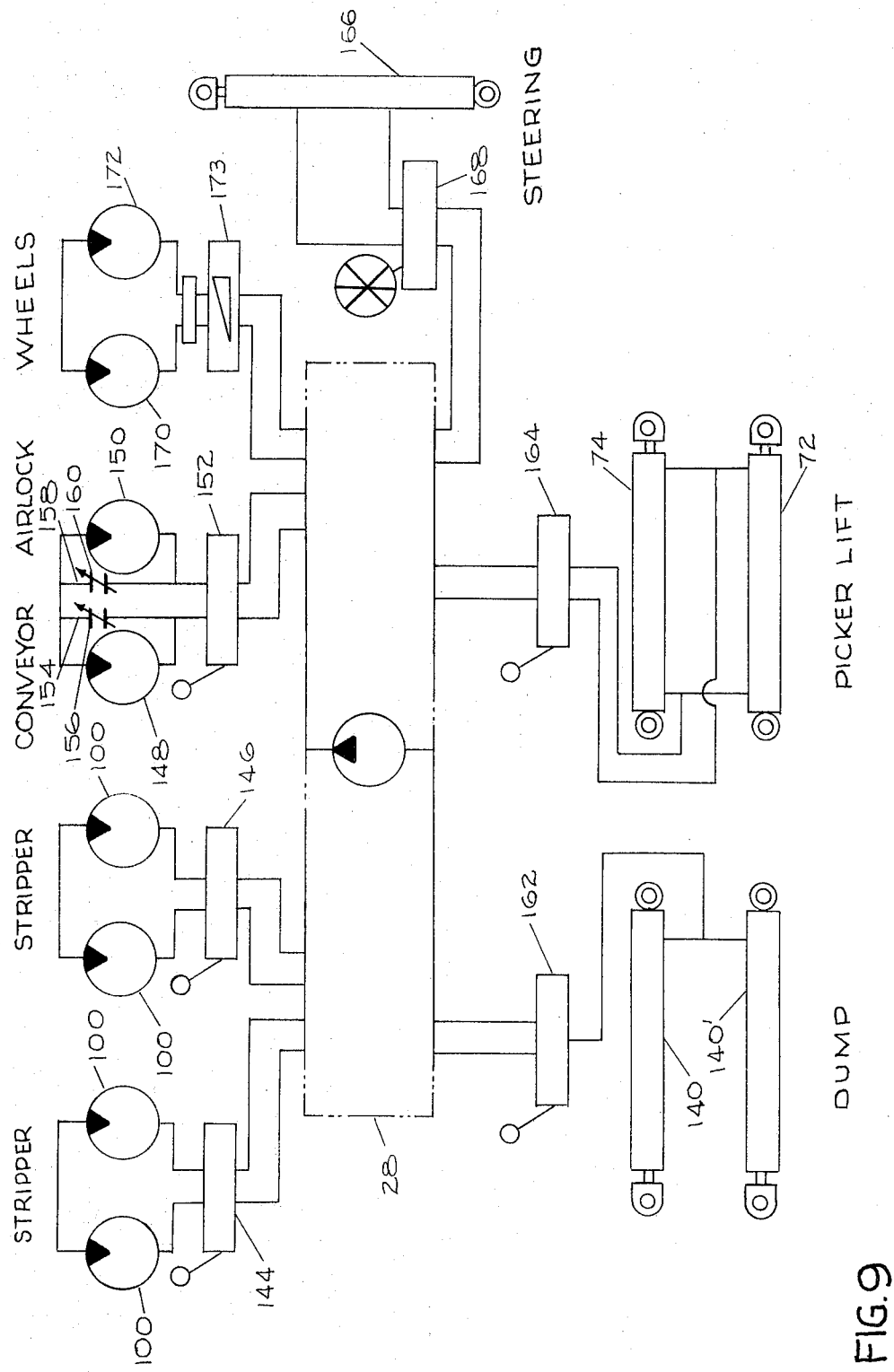
FIG. 9 is a schematic illustrating the hydraulic control system used in the present invention.

Turning now to the hydraulic control system of the harvester unit, as mentioned previously, the engine 30 drives hydraulic pump section 28 for operating the hydraulic control system of the harvester unit. There is one variable volume pump which is utilized to operate the drive wheels 24 and several other smaller pumps which operate the stripper reel motors, the conveyor and air lock motors, the dumping hydraulic cylinders and the stripper head lifting cylinders. The combined pumps are indicated by 28 shown in FIG. 9. The stripper reel pumps supply hydraulic fluid through forward and reverse control valves 144 and 146 and stripper motors 100. As can be seen in FIG. 9, the stripper motors on each head are connected in series. Another pump in the pump section 28 supplies fluid to the conveyor and air lock motors 148 and 150. The fluid is regulated by control valve 152 and is directed into motor 148 then into motor 150. By-pass lines 154 with a regulator valve 156 is used to control the flow of the hydraulic fluid through the motor 148, thus, providing means to regulate the speed of the conveyor. Another by-pass line 158 and regulator valve 160 is included in the system so that only a portion of the fluid may be passed through the air lock motor 150, thereby permitting the speed at which the air lock will rotate to be controlled. The pump section 28 also supplies hydraulic fluid to the dumping cylinders 140 and 140' and the pick-up cylinders 72 and 74. The flow of the hydraulic fluid is controlled by control valves 162 and 164. The steering on the harvester unit is also hydraulically controlled and a steering cylinder 166 controlling the rear steering wheel is connected through a control valve 168 to the hydraulic pump section 28.

As previously mentioned, the drive wheels of the harvester unit are connected to a variable volume pump so that the speed of the wheels can be controlled. The wheel motors 170 and 172 are connected through a parallel-series flow valve 173 to the variable volume pump. The parallel-series flow control valve permits the wheels to operate in the same direction or in opposite directions independently of one another.

OPERATION

The operation of the harvester unit is as follows. As the harvester unit is driven through the field, the rows of plants are directed through the stripper heads 32 and 32' by guide channels 48 and 48'. The stripper reels are on opposite sides of the plants and are rotated upwardly so that they comb through the plant and strip the fruit and foliage from the plant and throw it upwardly. The air exiting through gaps 62 and 64 and the bottom of the stripper head to initially entrain the fruit and foliage in an air stream and to permit it to be drawn upwardly through the exit port 44 by the negative flow. The aggregate material travels through conduits 116 and 118 into the separator 104. The air is separated from the aggregate material and directed back through conduit 122 into the negative side of blower 102. The aggregate falls down into the air lock whereby it is deposited on the inclined conveyor 124. A portion of air stream from the positive side of the blower unit is directed through a conduit 127 rearwardly and through inclined conduits 128 and transverse conduit 130. As the aggregate materials are thrown over the top of the conveyor 124, air generated by the blower unit 102 is directed downwardly so that all but about 15% of the leaf foliage is separated from the fruit. The fruit and remaining leaf are dropped into a receiving container or onto a conveyor for depositing in a collection point.

It can be seen from the above description and drawings that this proved harvester unit will provide a machine which will harvest vegetable crops with the minimum of field loss and damage to the fruit. It will also provide a unit which will pick mostly fruit and leaf foliage from a plant and leave the stalk and root system in the field. The harvester unit also can be used on a variety of crops, such as peppers, beans and the like. It also provides an improved stripper reel to mechanically strip the fruit and leaf foliage from the plant and a pneumatic conveying system to convey the aggregate material to the collection point. A conveying system also provides an improved means for entraining the fruit and foliage in the negative air stream.

This preferred embodiment can be modified in various ways, such as by providing the receiving conveyor belt in place of the receiving collection bucket shown in the disclosed embodiment; however, this type of variation can be made to the subject invention without departing from the true spirit of invention as defined by the following claims.

What is claimed is:

1. An apparatus for harvesting vegetable crops such as peppers, peas, beans and the like including:
   a. a motorized vehicle which can be moved along a row of vegetable plants;
   b. stripper means carried on the forward end of the vehicle for receiving the vegetable plants as the vehicle moves along said row, said stripper means removing an aggregate of fruit and foliage from the plants' stalks;
   c. a separator means carried on said vehicle for receiving the aggregate from said stripper means;
   d. blower means carried on the vehicle which communicate with said stripper means and said separator means, said blower means generating a positive and negative air current to entrain the aggregate in an airstream and pneumatically convey the aggregate from the stripper means to the separator means wherein the aggregate is separated from the airstream;
   e. means for driving the blower means;
   f. first conveyor means carried on said vehicle and associated with said separator means for receiving and transporting the aggregate discharged from said separator means; and
   g. collection means for receiving the aggregate from said first conveyor means.

2. The harvester apparatus of claim 1, wherein said stripper means has at least one stripper head comprising:
   a. a housing including spaced inside and outside skins with a passageway formed therebetween and an inner chamber within said inside skin, said housing having an entrance and exit opening in its forward and rear face, respectively, a slot along the bottom surface of said housing communicating with said entrance and exit openings, and a first and second port located on its upper surface, said first port communicating only with said passageway and said second port communicating only with said inner chamber, said passageway formed by said inside and outside skins, terminating in a longitudinal opening along said slot in the bottom of said housing;
   b. first and second conduits connected to said first and second ports, respectively, communicating with said blower means, said first conduit means being connected to the positive outlet of said blower means and conveying a positive air current to the inner chamber of said housing through the passageway in said housing and the longitudinal openings along the slot in the bottom of said housing, said second conduit being connected to the negative intake of said blower means through said separator means so that a negative pressure is applied to the upper portion of said inner chamber through said second port;

c. a pair of stripper reels having their shaft journaled in said housing and located on opposite sides of said slot, the stripper reels being used to comb through the plants and remove the fruit and leaf from the stalk, said stripper reel shafts being positioned in said inner chamber on an inclined angle with the leading end being the higher and converging from the leading end into the trailing end; and d. means for controlling the rotation of said stripper reels so that the stripper reels will comb through said plants in an upwardly direction as said plants pass between them.

3. The harvester apparatus of claim 1, further including means for removing a portion of the foliage from said aggregate prior to the aggregate being deposited in said collection means.

4. The harvester apparatus of claim 3, wherein said means for removing a portion of said foliage includes:

a. means for diverting a portion of the positive air current generated by said blower means from said stripper means; and b. conduit means for directing said portion of said positive air current to a location contiguous to the discharge end of said first conveyor means so that when the aggregate material is discharged from said first conveyor means the portion of positive air current is directed through the aggregate to remove a portion of the foliage from the aggregate, the fruit and the remaining foliage being deposited in said collection means.

5. The harvester apparatus of claim 1, wherein said stripper means has at least one stripper head comprising:

a. a housing having entrance and exit openings and a bottom slot communicating with said openings, said entrance opening in said housing receives the plants as the vehicle moves down a row;

b. a pair of stripper reels having their shaft journaled in said housing and located on opposite sides of said slot, said stripper reel shafts being positioned in the housing on an inclined angle with the leading end being the higher and converging from the leading end to the trailing end so that the stripper reels contact the plants to strip the fruit and foliage therefrom; and c. means for driving said stripper reel so that they rotate in opposite directions and engage the plants with an upwardly motion.

6. The harvester apparatus of claim 5, wherein each said stripper reel includes:

a. a plurality of longitudinal brushes secured to its shaft, the outline generated by the tips of said brushes upon rotation of the reels being frustro-conical in shape with the large base of the frustrum being at the leading end of the reel and the small base of the frustrum being at the trailing end of the reel; and b. a plurality of longitudinal rows of tines secured to said shaft and alternately positioned with said longitudinal brushes, said tines extending radially outward from said shaft and decreasing in size from the leading end to the trailing end of the reel, the outline generated by a line through the tips of a single longitudinal row of tines upon rotation of the reel being frustro-conical in shape with the large base of the frustrum being at the leading end of the reel and the small base of the frustrum being at the trailing end of the reel.

7. The harvester apparatus of claim 5, further including a means for removing a portion of the foliage from said aggregate prior to the aggregate being deposited in said collection means.

8. The harvester apparatus of claim 7, wherein said means for removing a portion of said foliage includes:

a. means for diverting a portion of the positive air current generated by said blower means from said stripper means; and b. conduit means for directing said portion of the positive air current to a location contiguous to the discharge end of said first conveyor means so that as the aggregate material is discharged from the conveyor means the portion of the positive air current is directed through the aggregate to remove a portion of the foliage from the aggregate, the fruit and remaining foliage being deposited in said collection means.

9. The harvester apparatus of claim 2, wherein each of said stripper reels includes:

a. a plurality of longitudinal brushes secured to its shaft, the outline generated by the tips of said brushes upon rotation of the reels being frustro-conical in shape with the large base of the frustrum being at the leading end of the reel and the small base of the frustrum being at the trailing end of the reel; and b. a plurality of longitudinal rows of tines secured to said shaft and alternately positioned with said longitudinal brushes, said tines extending radially outward from said shaft and decreasing in size from the leading end to the trailing end of the reel, the outline generated by a line through the tips of a single longitudinal row of tines upon rotation of the reel being frustro-conical in shape with the large base of the frustrum being at the leading end of the reel and the small base of the frustrum being at the trailing end of the reel.

10. The harvester apparatus of claim 1, further including a means for raising and lowering the stripper means to permit its positioning during the harvesting operation.

11. The harvester apparatus of claim 1, wherein said first conveyor means is an inclined conveyor belt having a plurality of cleats, said belt receiving the aggregate material from the separator means at its lowest end and transporting the aggregate upward on the cleats and throwing the aggregate onto said collection means.

12. The apparatus of claim 11, wherein said collection means includes:

a. a receptacle for receiving said aggregate from said first conveyor means; and (b) means for tilting said receptacle so that the aggregate can be removed from said receptacle.

13. The harvester apparatus of claim 11, wherein said collection means includes a generally horizontal second conveyor means for receiving the aggregate from said first conveying means and transporting it outboard of said harvester apparatus for deposit in a receptacle.

* * * * *